United States Patent [19]

Sakai et al.

[11] Patent Number: 6,113,651
[45] Date of Patent: Sep. 5, 2000

[54] COMPILE METHOD, A COMPILER, AN EXCEPTION HANDLER, AND A PROGRAM RECORDING MEDIUM

[75] Inventors: Ryuji Sakai, Tokyo; Yoichiro Takeuchi, Urawa; Masahiro Miura, Tokyo, all of Japan

[73] Assignee: Kabushiki Kaisha Toshiba, Kawasaki, Japan

[21] Appl. No.: 09/116,220

[22] Filed: Jul. 16, 1998

[30] Foreign Application Priority Data

Jul. 18, 1997 [JP] Japan ................................ 9-194038

[51] Int. Cl.$^7$ ................................ G06F 9/45; G06F 9/46
[52] U.S. Cl. ................ 717/6; 717/5; 717/4; 709/100; 710/260
[58] Field of Search ........................ 395/704–706, 395/708, 709; 714/38, 47, 48; 709/100; 710/260; 712/41, 228; 717/4, 5, 6

[56] References Cited

U.S. PATENT DOCUMENTS

| | | | |
|---|---|---|---|
| 5,517,664 | 5/1996 | Watanabe et al. | 712/41 |
| 5,628,016 | 5/1997 | Kukol | 395/704 |
| 5,729,676 | 3/1998 | Inoue | 714/38 |
| 5,778,233 | 7/1998 | Besaw et al. | 395/709 |
| 5,784,613 | 7/1998 | Tamirisa | 709/100 |
| 5,815,702 | 9/1998 | Kannan et al. | 712/244 |
| 5,946,492 | 8/1999 | Bates | 395/709 |
| 5,948,113 | 9/1999 | Johnson et al. | 714/38 |

OTHER PUBLICATIONS

Wong et al., "Exception Handling in C++ Without Language Extension," Proceedings of TENCON '93, IEEE Region 10 Conf. on Computer, Communication, Control and Power Engineering, pp. 411–414, vol. 1, Oct. 19–21, 1993.

Bringmann et al., "Speculative Execution Exception Recovery using Write-back Suppression," Proceedings of the 26th Annual Int'l. Symposium on Microarchitecture, pp. 214–223, Dec. 1–3, 1993.

Yi et al., "Estimating Uncaught Exception in Standard ML Programs from Type-based Equations," Proceedings of the 20th Int'l. COMPSAC '96 on Computer Software and Applications Conference, pp. 455–460, Aug. 21–23, 1996.

*Primary Examiner*—Tariq R. Hafiz
*Assistant Examiner*—Tuan Q. Dam
*Attorney, Agent, or Firm*—Finnegan, Henderson, Farabow, Garrett & Dunner, L.L.P.

[57] ABSTRACT

The present invention provides a compile method comprising steps of allocating a variable which is living and may be used after processing by an exception processing program, to a register whose contents are not changed in delivery processing, during a period of delivery processing when a flow of processing is delivered to the exception processing program written as a part of the program, in case where the exception occurs within a predetermined range of the program, and generating a code corresponding to the delivery processing.

13 Claims, 6 Drawing Sheets

FIG. 1
PRIOR ART

```
FUNC1 () {
    try {
        SENTENCE 3.1;
        FUNC3 () {
        ...
        }
    }
    catch (EQUATION 4)
        SENTENCE 4.1;
        ...
    }
    ...
}
```

```
FUNC3 () {
    try {
        SENTENCE 1.1;  ☆EXCEPTION
        ...              OCCURS!
    }
    catch (EQUATION 4) {
        SENTENCE 2.1;
```

(a) PROCESS OF EXCEPTION HANDLER

A KIND OF EXCEPTION : K
        LOCATION IN WHICH EXCEPTION OCCURS : A

[PROCESS a]   (STORE ADDRESS OF EXCEPTION INFORMATION TABLE TO T)
                T = re + [re-4] ;
                A' = A-re ;

[PROCESS b]   (UNTIL CORRESPONDING EXCEPTION IS FOUND)
                for (;  [T] != 0;  T +=16 {
                   if (A' >=[T]  && A' < [A+4]
                    && [T+12]) ==K {

[PROCESS c]         (FOUND)
                      jmp [T+8] + re ;
                }
              }

[PROCESS d]   (NO FOUND)
                A = RETURN ADDRESS FROM PROCEDURE
                SET RETURN ADDRESS FROM PROCEDURE OF
                  STACK FRAME
                TO THAT OF EXCEPTION
                jmp T+4 ;

(b) PROCEDURE WHEN CORRESPONDING EXCEPTION IS NOT FIND

A: LOCATION IN WHICH        A: RETURN ADDRESS
       EXCEPTION OCCURS           FROM PROCEDURE

---->

NOTE: [X] IS CONTENT OF ADDRESS X

FIG. 11

COMPILE METHOD, A COMPILER, AN EXCEPTION HANDLER, AND A PROGRAM RECORDING MEDIUM

BACKGROUND OF THE INVENTION

The present invention relates to a compile method, a compiler, an exception handler, and a program recording medium, which are particularly associated with translation into a machine language such as a programming language by which exception processing in a computer can be efficiently dealt with or associated with efficient dealing of a program thus translated.

A compiler is a piece of software by which a source program (or source file) written in a programming language and relating to a program used in a computer is translated into a machine language, thereby to prepare an object (or object file).

There are various programming languages, and languages capable of processing an exception in accordance with an instruction from a user in the level of a user program have come to be used in recent years. Exception processing means processing which responds when undesirable processing occurs while executing the program. For example, processing with regard to processing of dividing a certain variable by 0. Such exceptions include use of an array area deviating from an area to be properly used, a null-pointer (0-address reference), an Input/Output (I/O) error, and the like.

Thus, in a programming language capable of efficiently processing exceptions, it is possible to specify a particular range of a program and to recognize an exception occurring within the range, to control the flow of the program. For example, it is supposed that program format is written as follows.

```
try {
    sentence 1, 1;
    sentence 1, 2;
    ...
    sentence 1, N;
}
catch (equation 2) {
    sentence 2, 1;
    ...
}
catch (equation 3) {
    ...
}
...
```

In this case, if an exception corresponding to an equation 2 occurs within a range surrounded by "try" (which will be hereinafter called a try section) and including sentences 1.1, 1.2, . . . , 1.N, the flow of the program goes to a section surrounded by "catch" corresponding thereto (which will be hereinafter called a catch section) and including a sentence 2.1, . . . , . This means that an exception occurring in the try section is processed in the catch section.

The processing described above will be schematically expressed as in FIG. 1.

Figure 1:
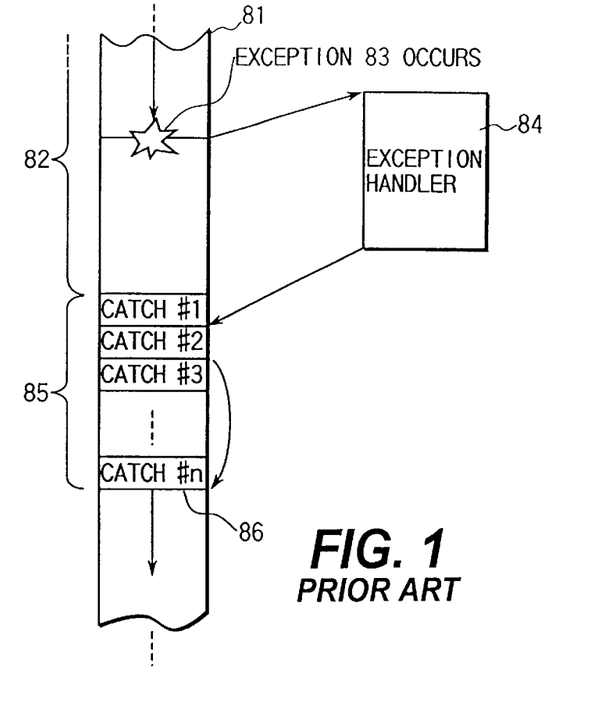
FIG. 1 is a diagram showing an example of a processing flow when an exception has occurred during execution of a program.

FIG. 1 is a diagram showing the flow of processing when an exception occurs during execution of a program.

At first, when an exception 83 occurs during execution of a try section 82 in a program 81, the flow of the processing is shifted to an exception handler 84. The exception handler 84 determines which of a plurality of catch sections 85 (#1, #2, . . . , #N) the exception corresponds to, and the processing flow is shifted to the corresponding catch section 85 thus determined. The exception handler 84 is a program for allocating exception processing. Although the exception handler 84 is provided in a kernel level in an OS (operating system) in some cases, it is here supposed that the handler 84 is previously prepared as an object in a library and is linked with an object as a program body by a linker.

Supposing that a program for processing the exception 83 is provided in the catch section #2 and the flow of the processing is shifted to the catch section #2 by the exception handler 84. The catch section #2 executes predetermined exception processing and shifts the processing to a predetermined destination 86 after exception processing.

The series of processing as described above ensures the operation from occurrence of an exception to completion of exception processing and to recovery of normal processing.

A program constitutes a nest structure which starts from a main loop such as a main entry and then calls other objects and functions. In other words, processing is carried out hierarchically, and other objects and functions are read starting from a main loop.

The following will explain how exception processing is carried out in this case.

For example, if a current procedure is a called function and if occurrence of an exception does not have a corresponding catch section, the flow immediately returns from a currently executed procedure and exception processing is continued assuming that an exception occurs at the location where the flow returns.

Figure 2:
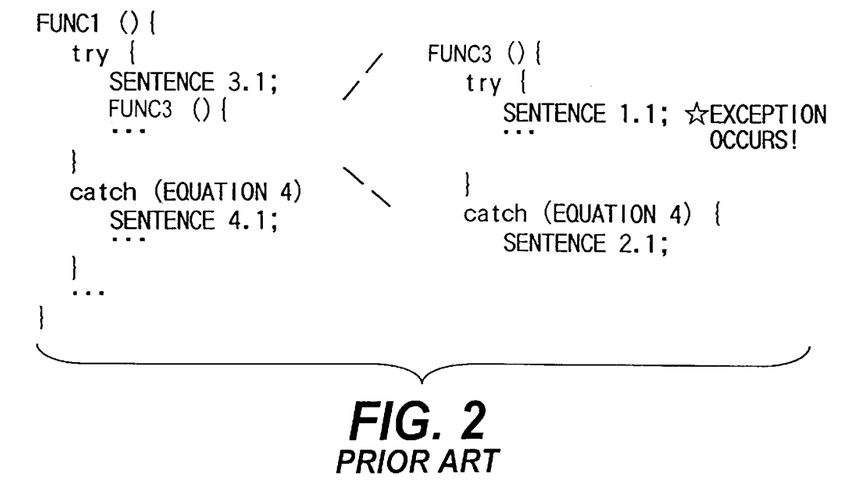
FIG. 2 is a diagram showing a program example for explaining processing where an exception has occurred in a calling function.

FIG. 2 is a diagram showing a program example for explaining processing in a case where an exception occurs in a calling function.

In the figure, it is supposed that an exception has occurred in a sentence 1.1 in a try section in a FUNC 3 called from a FUNC 1. In this time, if there is no catch section corresponding to the exception, the processing flow returns to the position immediately after a FUNC 3 in the FUNC 1 is called. The processing flow goes again to an exception handler to check whether or not there is corresponding exception processing in the FUNC 1. In this case, if the exception corresponds to the catch section (equation 4) in FUNC 1, the flow of the program is shifted to the sentence 4.1.

Figure 3:
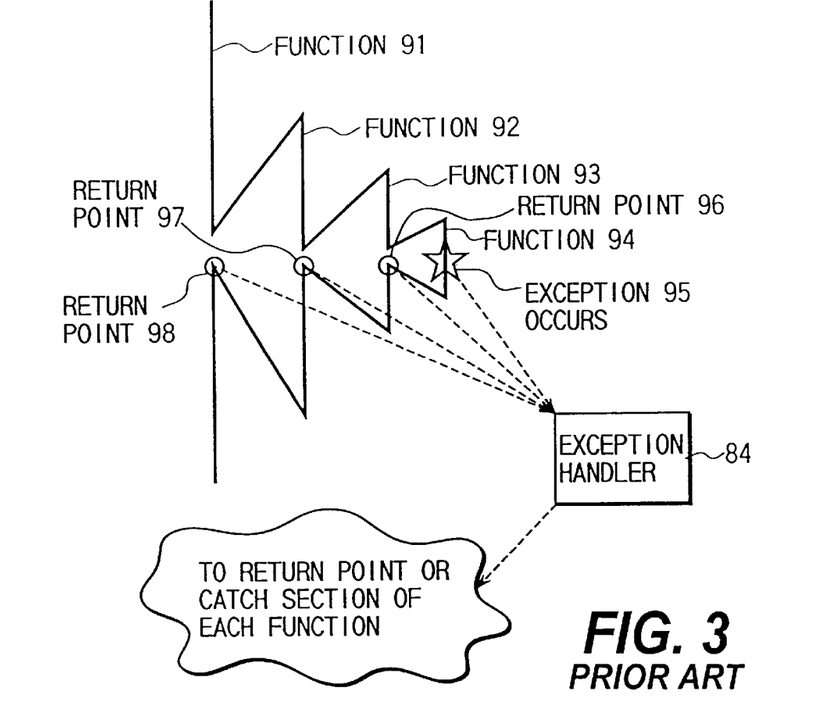
FIG. 3 is a diagram showing an example of a nest structure where functions are hierarchically called and processing is executed.

FIG. 3 shows a nest structure in a case where functions are hierarchically called and processing is carried out.

For example, in case of including a nest loop as shown in the figure, if an exception 95 occurs in a function 94, the exception handler 84 searches for a catch section for executing corresponding exception processing in the function 94. If no corresponding exception processing is found, the function 94 is returned to a return point 96 of a function 93. In the function 93, the processing is shifted to the exception handler 84 and the similar operation is sequentially repeated. If no corresponding catch section is found in the functions 94, 93, and 92, the program is finally returned to a function 91. In this process, the processing is shifted from every one of return points 96, 97, and 98.

A compiler must translate a source file into such a machine language in which a mechanism as described above operates properly. Therefore, the compiler maintains a table (which will be hereinafter referred to as an exception information table) describing a range surrounded by "try" (from the top of a sentence 1.1 to the end of a sentence 1.N), kinds of exceptions (equations 1, 2, . . . ), and positions (tops of sentences 2.1, 3.1, and the like) to which control is shifted when the exceptions occur. If an exception occurs, the compiler generates machine language command lines.

The exception handler serves to check the exception information table and to perform processing of shifting the flow of the program to a corresponding catch section.

Note that the structure of the exception information table consists of "start position at try section", "end position at try section", start position of corresponding catch section", and "kind of exception".

If an exception occurs in the exception processing method described above, variables defined until the time immediately before occurrence of the exception are referred to in a catch section or in a section after the catch section, in several cases. Therefore, the values of those variables may not be broken in the processing by the exception handler.

There are two methods to realize this.

In one method, values of all the registers to be used by an exception handler are put aside into a memory at the top of an exception handler and the values of the registers thus put aside are written back into the registers when the flow returns from the exception handler (e.g., when the flow enters into a catch section).

In the other method, when compiling a program, variables which are live at the entry of a catch section are allocated not to registers but to a memory. A variable x which is live at a time point means a possibility that the contents of the variable x may be referred to after the time point. Such a variable x is called a live variable, i.e., the other variables than the live variable x are dead variables.

Compiling is conventionally carried out in accordance with either of the two methods described above. In case where compiling is carried out in accordance with the former method, there are problems that the processing by the exception handler is slow, or that, when no corresponding catch section is found and the flow returns from a procedure, processing for recovering original states of registers broken by the procedure is carried out, and therefore, information of the registers to be broken by the procedure must be held in any way. Meanwhile, in case where compiling is carried out in accordance with the latter method, there is a problem that allocation of variables to registers is restricted due to exception processing, and therefore, the execution efficiency is lowered even in the processing to be carried out when no exception occurs.

In addition, the following problems are involved by a compiler of a program language capable of processing an exception as instructed by a user within the level of a user program.

Since the flow of a program is changed by occurrence of an exception, commands are not rearranged by optimization during compiling, before and after a section where an exception may occur. If the layout is changed, values of variables living at the entry of a catch section cannot be guaranteed.

Further, where in a program sequence in a try section an exception will occur can be determined only during execution of a program. Therefore, when compiling a program, it is necessary to check whether or not an exception has occurred, at every one of the portions where an exception can occur. For example, when the flow returns from a procedure as in the case of in FIG. 3, it is necessary to check whether or not an exception has occurred in a procedure called. If an exception has occurred, it is necessary to generate an exception information table and a command line for transmitting the current position to an exception handler. This is a factor which increases the program execution period where no exception has occurred.

BRIEF SUMMARY OF THE INVENTION

The present invention has been made in view of the situation as described above, and has a first object of providing a compile method, a compiler, and a program recording medium which are capable of efficiently generating an object code without reducing the efficiency in use of registers and without breaking variables living in an exception handler.

The present invention further has a second object of providing a compile method, a compiler, an exception handler, and a program recording medium which are capable of efficiently continuing processing an exception, when an exception occurs in a called procedure, no processing corresponding to the exception is included in the procedure, and the processing returns to a source calling.

To achieve the objects described above, of the first aspect of the present invention, there is provided a compile method comprising steps of: allocating a variable which is living and may be used after processing by an exception processing program, to a register whose contents are not changed in delivery processing, during a period of delivery processing when a flow of processing is delivered to the exception processing program written as a part of the program, in case where the exception occurs within a predetermined range of the program; and generating a code corresponding to the delivery processing.

Since the present invention is provided with means as described above, it is possible to generate efficiently an object code without reducing the efficiency in use of registers and without breaking variables living in an exception handler.

Also, of the second aspect of the present invention, there is provided a compile method comprising the steps of: generating an exception information table holding information concerning an exception processing program which is referred to when a flow of processing is changed by delivery processing for delivering the flow of the processing to the exception processing program written as a part of the program, in case where an exception has occurred within a predetermined range of the program; locating a relative location of the exception information table with respect to each of procedures, at a location of a fixed offset from an entry of each of the procedures; and storing an entry address of a procedure called by a procedure in a calling side when a new procedure is called, into a register which can be accessed from the procedure to be called, thereby to generate an object capable of the exception information table of each of the procedures, in accordance with a definite rule.

Since the present invention is provided with means as described above, it is possible to referred to an exception information table in accordance with a definite rule and to perform efficiently processing, when an exception occurs in a called procedure, no processing corresponding to the exception is included in the procedure, and the processing returns to a source calling.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, embodiments of the present invention will be explained with reference to the drawings.

Figure 4:
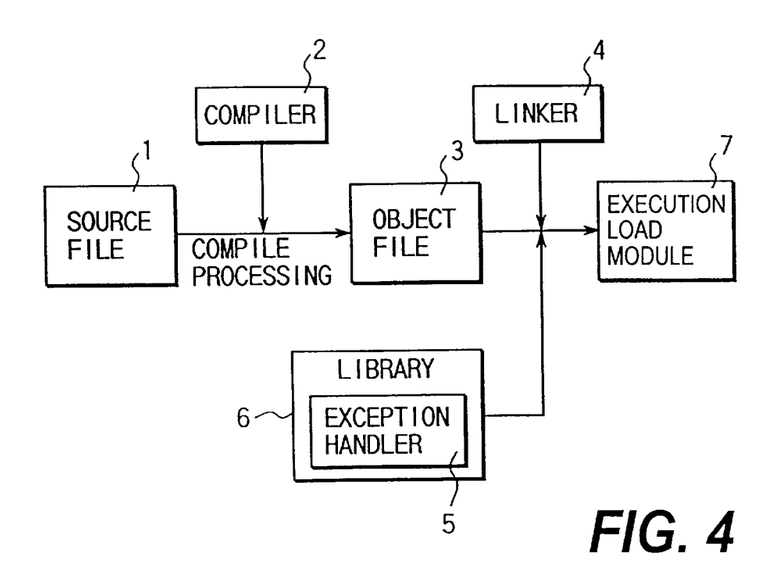
FIG. 4 is a block diagram showing a system example in which a source file is processed by a compiler or the like according to an embodiment of the present invention.

FIG. 4 is a block diagram showing an example of a system in which a source file is processed by a compiler or the like according to an embodiment of the present invention.

The present system is realized by a computer which reads a program recorded on a recording medium such as a magnetic disk or the like and controls operation by the program.

In this system, at first, a source file 1 is translated into a machine language by a compiler 2 to prepare an object file 3. Next, the object file 3 is linked with a library 6 including an exception handler 5 by a linker 4 to prepare an execution load module 7.

The source file 1 is written in a program language capable of processing an exception as instructed by a user within a level of a user program. The compiler 2 responds to compiling by the program language.

Next, processing procedures taken by the compiler will be explained with reference to FIGS. 5 to 9.

Figure 5:
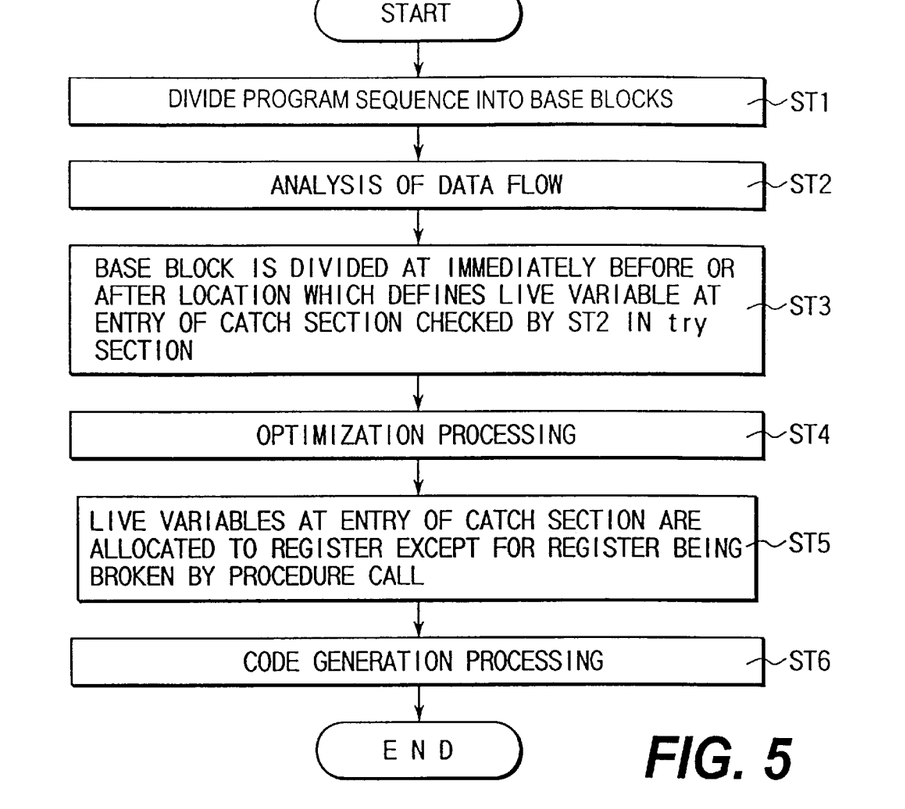
FIG. 5 is a chart showing processing by a compiler according to the embodiment.

FIG. 5 is a flowchart showing the processing by the compiler according to the present embodiment.

The compiler 2 firstly divides a program sequence into base blocks immediately after a branch and at a target of the branch in accordance with normal branch processing, to prepare a control flow graph (ST1).

Figure 6:
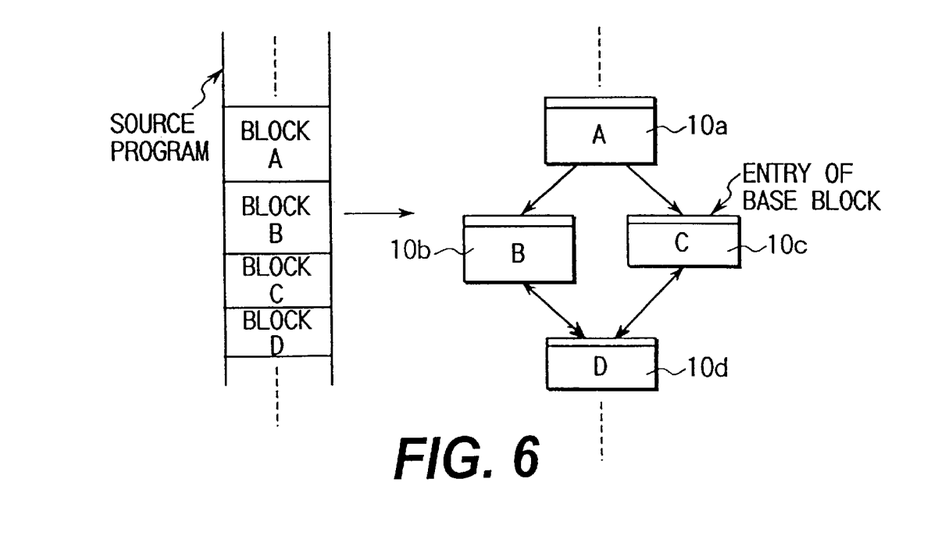
FIG. 6 is a graph for explaining a state where a program sequence is divided into base blocks.

FIG. 6 is a schematic diagram exemplifying a state in which a program sequence is divided into base blocks.

For example, if a block A includes a branch command such as an "if" sentence, subsequent processing can be branched into a plurality of branches. In the figure, blocks B and C correspond to such branches and the processing is succeeded from the blocks B and C to a block D.

Figure 8:
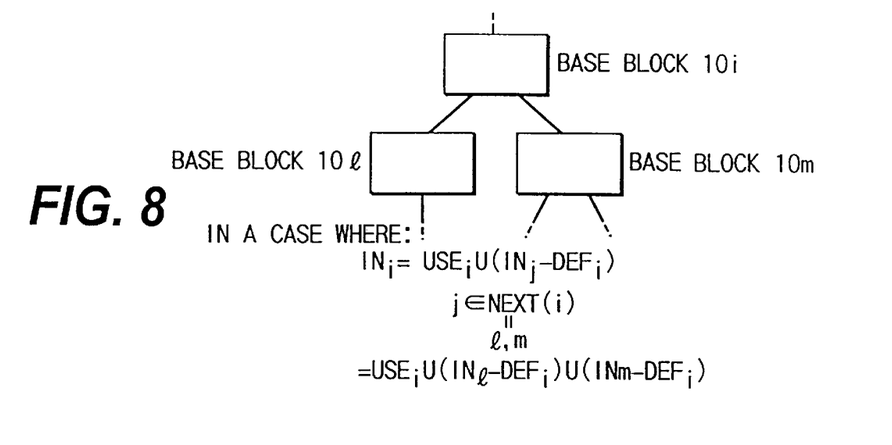
FIG. 8 is a diagram showing an example of an aggregation INi.
Figure 9:
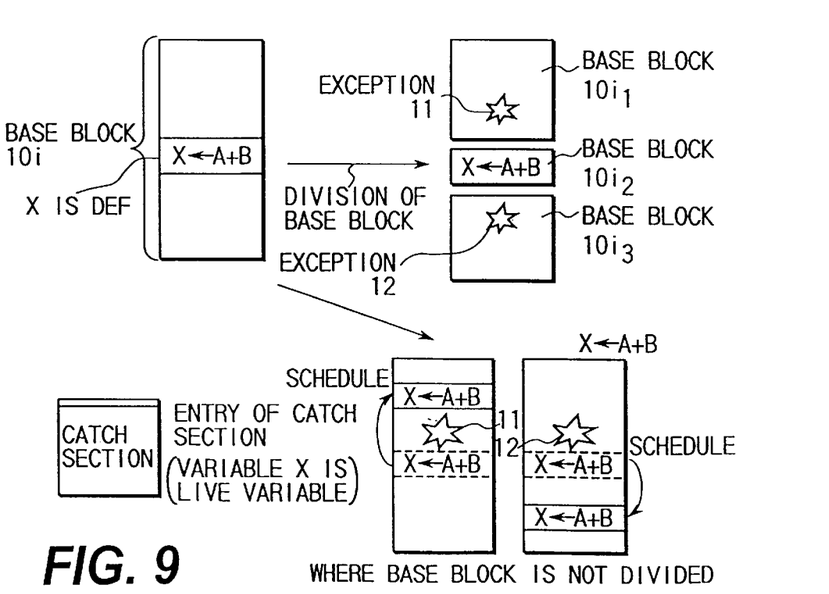
FIG. 9 is a view sowing a state where a base block is divided immediately before and after a base block of a try section defining a variable living at an entry of a catch section.

In this case, the blocks A, B, C, and D are divided into base blocks $10a$, $10b$, $10c$, and $10d$, as shown in FIG. 6. It is to be noted that the base blocks will be referred to as base blocks $10i$, $10l$, and $10m$, as shown in FIG. 8 or base blocks $10i_1$, $10i_2$, and $10i_3$ as shown in FIG. 9. These base blocks 10 are connected by a mutual relationship between each other, as shown in a control flow graph in FIG. 6.

Next, a set of variable USE referred to by each base block 10 and variable DEF to be defined are obtained. Based on the set obtained, the data flow equation indicated by an equation (1) is solved (ST2).

$$INi = USEi \cup_{j \in \text{next}(i)} (INj - DEFi) \qquad (1)$$

USEi is a variable referred to by the base block $10i$, and DEFi is a variable to be defined by the base block $10i$. next(i) is a base block 10 to which control is shifted from the base block $10i$. The initial value of each INi is an empty set. These will be explained with reference to examples shown in FIGS. 7 and 8.

Figure 7:
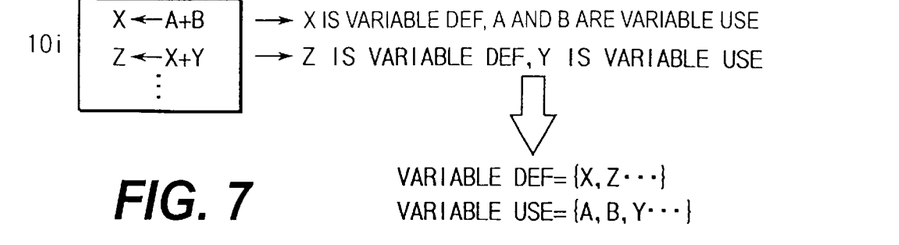
FIG. 7 is a view showing examples of a variable USE and a definitional variable DEF.

FIG. 7 is a view showing examples of a variable USE and a definitional variable DEF.

FIG. 8 is a diagram showing an example of a set INi.

As shown in FIG. 7, a variable X defined by a base block $10i$ is a variable DEFi. In the figure, variables A and B are used in the base block $10i$ but are not defined. Therefore, the variables A and B are variables USEi. Likewise, a variable Z is a variable DEFi. Although the variables X and Y are variables USEi, the variable X is defined by the base block $10i$ and is finally a variable DEFi.

Therefore, in the example shown in FIG. 7, the variable DEFi is expressed as {X, Z, ...} and the variable USEi is expressed as {A, B, Y, ...}.

FIG. 8 shows an example of a set INi.

As shown in the figure, in this case, the next(i) which represents base blocks to which control of the base block $10i$ may be shifted consists of the base block $10l$ and the base block $10m$. Therefore, the set INi in this case is a sum-set of USEi, (INl−DEFi), and (INm−DEFi).

Supposing that INl and INm are equal to the variable USE used in the base blocks $10l$ and $10m$, the sum-set is obtained by subtracting the variable DEF defined by the block of itself from the variable USE used in the next base blocks and further by attaining a sum-set of the subtraction result and the variable USE of the base block itself. Therefore, in this case, the set INi means variables which can be referred to in the base block itself and a next base block. Since definition variable DEF of the base block itself is subtracted from the set INi, the set INi means the variables living at the entry of the base block $10i$.

This case has been explained in relation to the base blocks $10i$, $10l$, and $10m$. However, since the data flow equation indicated by the equation (1) is a simultaneous equation of all the base blocks 10, variables living at the entry of the base blocks 10 can be obtained at the entry of each of the base blocks 10, in consideration of all the base blocks 10.

Thus, if variables living at the entry of each base block 10 are obtained, the variables living at the entry of each catch section can be analyzed. That is, processing is shifted from a certain block 10 to an exception handler and is thereafter shifted to a catch section. Therefore, any variable living at the entry of a certain base block 10 must be living at the entry of a catch section.

Next, the base block 10 will further be divided if the following conditions are satisfied. Specifically, if there is any try section which defines a variable living at a catch section, the base block is divided into three blocks immediately before and after the try section (ST3).

FIG. 9 shows a state in which a base block is divided immediately before and after a base block of a try section which defines variables living at the entry of a catch section.

Supposing that a variable X is defined in the base block 10*i* as shown in the figure, the base block 10*i* is divided into base blocks 10*i*1, 10*i*2, and 10*i*3 before and after the base block 10*i*. In this case, the base block 10*i*2 is a section which defines the variable X. This division is made because a problem can occur in case where execution orders of commands are exchanged to improve the efficiency of execution by a command schedule as a compiler function.

For example, if an exception 11 occurs at the portion of the base block 10*i*1 in FIG. 9, if the base block is not divided, if the portion of the base block 10*i*2 is arranged at a position before the position where the exception 11 occurs by the command schedule, and if the variable X is living in a corresponding catch section, processing different from that intended by an original source program is carried out in the catch section.

The same manner as described above also applies to a case where an exception 12 occurs in the portion of the base block 10*i*3, the base block is not divided, if the portion of the base block 10*i*2 is arranged at a portion after the position where the exception 12 occurs, and the variable X is living in a corresponding catch section.

Therefore, in this case, the base block 10*i* is divided before and after, and the command schedule is optimized in units of base blocks 10. Depending on the method of compiling, the execution order of commands is guaranteed even if the command schedule is carried out. In case of adopting such a method, the present step ST3 is not required.

Next, in this state, the compiler 2 carries out general optimization (ST4) with the base block 10 regarded as a unit of optimization. The contents of the optimization includes partial equation deletion, coefficient transmission, strength reduction, loop invariant movement, command schedule, and the like.

Next, in the compiler 2, variables living at the entry of a catch section are allocated to registers, such as callee-saved registers, other than the registers whose values are broken by calling a procedure (ST5).

In a MPU of a RISC type, a linkage rule is used as a general rule. This is used to separately use a register group #1 of registers whose values are not changed before and after calling a function, from a register group #2 of registers whose values may be changed (i.e., the contents are broken). In case of adopting this rule, when calling a function, variables which are living at the time when the function is called are allocated to the register group #1 and variables which are dead at this time are allocated to the register group #2. In this manner, values are guaranteed before and after calling a function, with respect to those variables whose contents must not be broken.

In the register allocation in the present step ST5, the way of thinking as described above is applied to shifting of processing to the exception handler 5.

Specifically, the variables which are living at the entry of a catch section are known from the processing in each of the steps described above. Therefore, the variables which are living at the entry of the catch section are allocated to the register group #1 described above while the variables which are dead are allocated to the register group #2 described above, at the time point when the processing is shifted to an exception handler 5, considering the exception handler 5 as a kind of function.

Thus, with respect to the shift of processing to the exception handler 5, variables are not unnecessarily allocated to a memory but the contents of variables which are living after the processing in the exception handler 5 can be guaranteed, by allocating the variables which are living at the entry of a catch section to the registers whose contents are not broken by a procedure defined by the linkage rule.

To perform fully the function as described above, the exception handler 5 must be programmed so as to use the register group #2 as much as possible.

Finally, the compiler 2 generates a code with which an exception information table and return processing from a procedure can be retrieved by an address of the entry of the procedure (ST6).

For example, in the side of calling a procedure, an entry address of a procedure to be called is stored into a primary register rt and the value of the rt is stored into a fixed register re which is saved in the procedure, in the side of being called, so that the procedure thus called can recognize the entry address. In addition, various information including an offset to an exception information table and the like are provided before the entry of the procedure, and an exception information is provided before return processing from the procedure.

Figure 10:
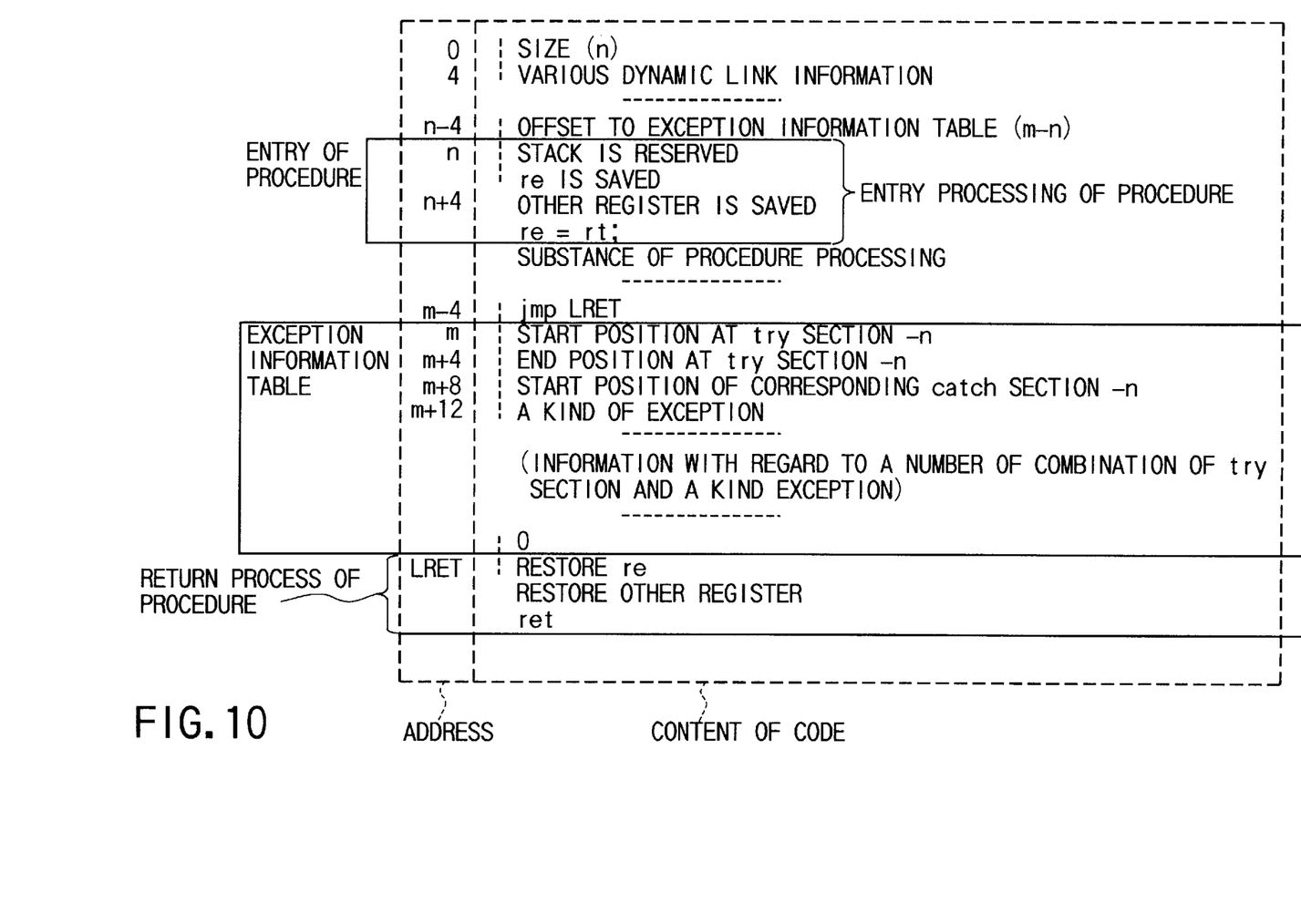
FIG. 10 is a view explaining an example of an object structure prepared by a compiler according to the embodiment.

FIG. 10 is a view showing an example of an object structure prepared by the compiler according to the present embodiment.

Specifically, an object as shown in FIG. 10 is generated through the steps ST1 to ST6 described above.

Next, explanation will be made of operation of the exception handler which deals with the object thus coded and generated.

Figure 11:
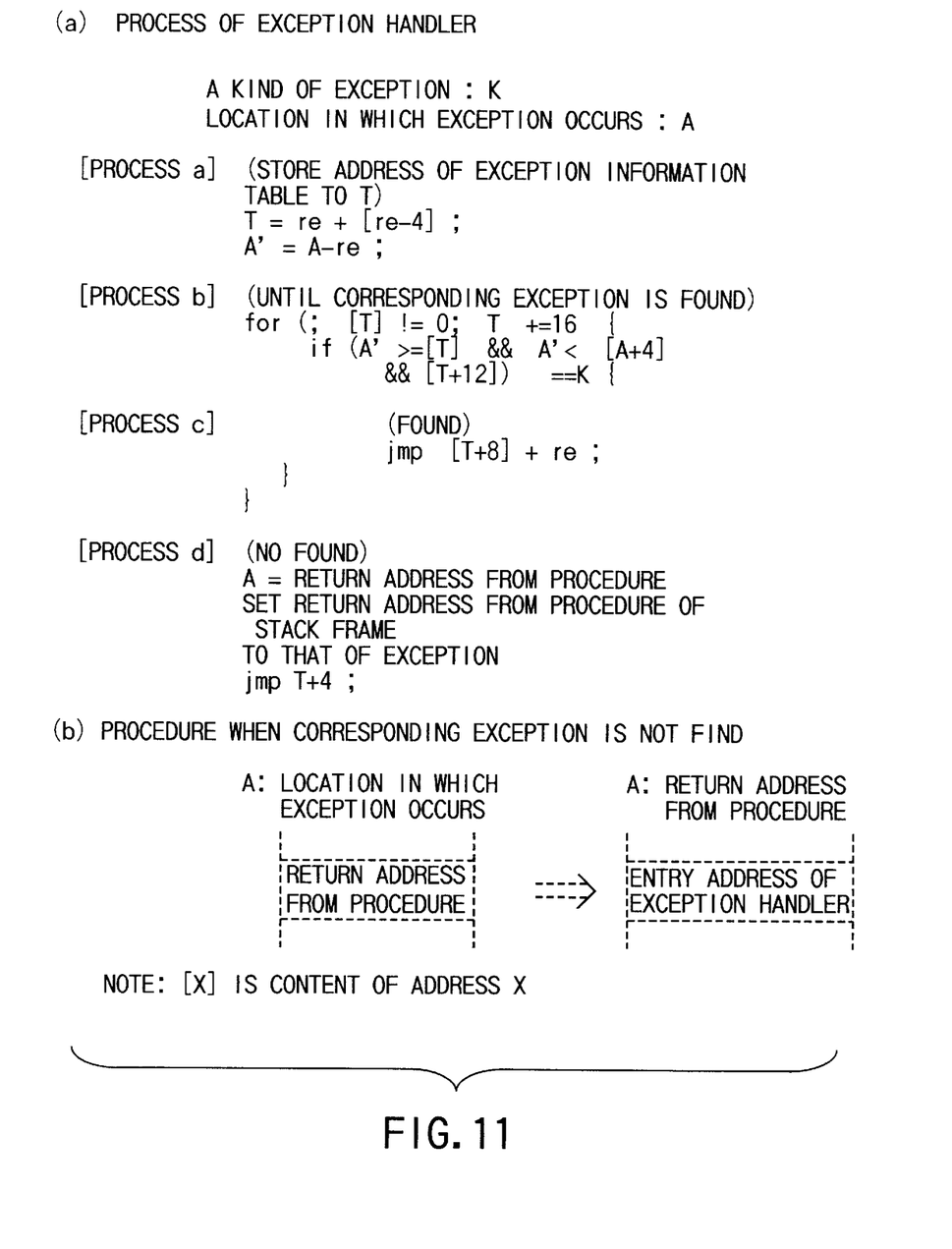
FIG. 11 is a view including a program showing processing of an exception handler according to the embodiment.

FIG. 11 is a view including a program expressing the processing by the exception handler according to the present embodiment.

Processing in which an exception has occurred is branched to the entry of the exception handler 5, with the kind K of the exception and the location A where the exception has occurred being used as arguments.

The exception handler 5 obtains an exception information table and the offset A' of the location where the exception has occurred from the value of the register re (processing (a)) and searches information corresponding to the exception from the exception information table (processing (b)).

If information is found, the start position of a corresponding catch section is obtained and the processing is branched thereto (processing (c)).

If not found, a return address from the procedure is obtained from a stack frame and is substituted into A, the return address is written over into the exception handler, and the processing is branched to the return processing from the procedure (processing (d)).

In the processing (d), the processing can be branched to the return processing from the procedure by setting jmp T+4 because an exception information table is provided immediately before the return processing from the procedure, as shown in FIG. 10, and also because the address T+4 as the last address of the exception information table is determined as the address of the return processing from the structure of the exception information table, in this case.

If the processing is branched to the return processing, recovery of registers is carried out and the processing returns from the exception to the processing (such as a function or the like) which has called the processing (such as a function or the like) in which the exception has occurred. In this case, however, since the return address from the procedure on the stack frame has been written over to be the entry address of the exception handler by the above processing (d), the control is shifted directly to the exception handler and the exception processing is continued. At this time, since the register re has been recovered, the exception information table can be properly looked up to, and it operates as if the processing is shifted from the return location of the processing which has called the processing in which an exception has occurred.

Therefore, if the program has a nest structure as shown in FIG. 3, the processing needs not be returned to a function or the like which originally has called the processing every time before the processing is shifted to the exception handler 5, but the processing by the exception handler 5 is continued until a corresponding catch section is found. In this case, only the information of each of the registers is written over with the information of the calling origin, and thus, the exception information table is properly referred to in correspondence with the calling origin.

Also, the compiler 2 generates a command line in correspondence with the operation of the exception handler 5. That is, when the processing returns from a command line of a procedure indicated by the prior art in case of FIG. 3, whether or not an exception has occurred in the called procedure is checked. If an exception has occurred, it is unnecessary to generate a command line for performing processing of transmitting an exception information table and the current location to the exception handler, every time.

As has been described above, in the compile method and the compiler according to the embodiment of the present invention, variables which are living between try and catch sections are allocated to registers whose contents are not broken if the exception handler obeys a procedure defined by a linkage rule, when compiling a programming language having a construction of sentences capable of efficiently dealing with an exception such as try-catch. Therefore, it is possible to generate efficiently an object code without reducing the efficiency of using registers and without breaking variables which are living in the processing by the exception handler.

This is particularly effective for a computer equipped with many registers, like a RISC processor or the like.

Rewinding of a procedure by exception processing can be properly performed if there is no saving information concerning registers.

As has been described above, in the compiling method, the compiler, and the exception handler according to the embodiment of the present invention, variables which are living between try and catch sections are allocated to registers and the return address on a stack frame is overwritten if register saving information is not used. Therefore, it is not necessary to check an exception when the processing is returned from a procedure, and it is possible to reduce a reduction of the execution efficiency in a normal path in a case where no exception has occurred.

Therefore, processing concerning an exception can be efficiently continued even when an exception has occurred in a called procedure, the procedure does not include processing corresponding to the exception, and the processing is returned to a calling destination.

The present invention is not limited to the embodiments described above but can be variously modified without departing from the scope of the invention.

The methods described in the embodiments can be stored as programs which can be executed by a computer, for example, in a memory medium such as a magnetic disk (such as a floppy disk, a hard disk, or the like), an optical disk (such as a CD-ROM, DVD, or the like), or a semiconductor memory, or the methods can be distributed by transmission through a communication medium. The computer for realizing the present invention executes the processing as described above by reading a program recorded on a recording medium and by controlling operation in accordance with the program.

As h as been specific ally described above, according to the present invention, it is possible to provide a compile method, a compiler, and a program recording medium which are capable of generating an object code without reducing the efficiency of using registers and without breaking variables which are living in the processing by the exception handler.

Also, according to the present invention, it is possible to provide a compile method, a compiler, an exception handler, and a program recording medium, by which processing concerning an exception can be efficiently continued even when an exception has occurred in a called procedure, the procedure does not include processing corresponding to the exception, and the processing is returned to a calling destination.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A compile method comprising the steps of:

allocating a variable which is living and used after processing by an exception processing program, to a register whose contents are not changed in delivery processing, during a period of the delivery processing in which a flow of processing is delivered to the exception processing program written as a part of a program, in case where exception occurs within a predetermined range of the program; and generating a code corresponding to the delivery processing.

2. A compile method according to claim 1, wherein the register is a register whose contents are preserved across procedure calls which defined as callee-saved registers in linkage rule.

3. A compile method according to claim 1, further comprising the steps of:

dividing the program into base blocks in units of branch processing, and extracting a definition variable defined in each of the base blocks and a use variable to be used in each of the base blocks other than the definition variable, before the step of allocating the variable to the register;

investigating a variable which is living at an entry of each of the base blocks, by performing data flow analysis, based on the definition variable and the use variable in each of the base blocks; and determining a variable which is living and has a possibility of use after the processing by the exception processing program from the variable which is living at the entry of each of the base blocks.

4. A compile method according to claim 3, wherein the base blocks are divided at immediately before and after a location in the base blocks, the location defines the variable which is living at the entry of the exception program, and optimization of a command schedule to be normally performed by a compiler is performed with respect to the base blocks thus divided, after the step of determining the variable which is living.

5. A compile method according to claim 1, wherein the predetermined range of the program is a try section and the exception processing program includes at least one catch section, and the delivery processing is an exception handler provided outside the program.

6. A compile method comprising the steps of:

generating an exception information table holding information concerning an exception processing program which is referred to when a flow of processing is changed by delivery processing for delivering the flow of the processing to the exception processing program written as a part of the program, in case where an exception has occurred within a predetermined range of the program;

locating a relative location of the exception information table with respect to each of procedures, at a location of a fixed offset from an entry of each of the procedures; and storing an entry address of a procedure called by a procedure in a calling side when a new procedure is called, into a register which is accessed from the procedure to be called, thereby to generate an object which refers to the information stored in the exception information table of each of the procedures.

7. A compile method according to claim 6, further comprising the step of:

obtaining an address of return processing of the procedure in the calling side, if no exception processing program corresponding to the exception is found by the delivery processing, thereby to jump to the return processing in the calling side, and to generate an object capable of recovering the register.

8. A compile method according to claim 7, wherein the method includes an exception handler used for delivering the flow of the processing to the exception processing program after an exception has occurred in case where the exception has occurred in the object generated in the step of generating the object, the compile method further comprising the step of returning to a procedure in a procedure calling side and simultaneously starting the delivery processing with respect to a procedure in a procedure calling side, in a manner in which the exception handler replaces a return address from a procedure on a stack frame with processing start address of the exception handler and jumps to return processing from the procedure, if an exception has occurred in the object generated by the step of generating the object and if no exception processing program corresponding to the exception is found.

9. A computer system comprising:

means for allocating a variable which is living and may be used after processing by an exception processing program to a register whose contents are not changed in delivery processing, during a period of delivery processing when a flow of processing is delivered to the exception processing program written as a part of the program, if the exception occurs within a predetermined range of the program, and means for generating a code corresponding to the delivery processing.

10. A computer system comprising:

means for generating an exception information table holding information concerning an exception processing program which is referred to when a flow of processing is changed by delivery processing for delivering the flow of the processing to the exception processing program written as a part of the program if an exception has occurred within a predetermined range of the program, means for locating a relative location of the exception information table with respect to each of procedures at a location of a fixed offset from an entry of each of the procedures, and means for storing, when a new procedure is called, an entry address of a procedure called by a procedure in a calling side into a register which is accessed from the procedure to be called, thereby to generate an object which refers to the information stored in the exception information table of each of the procedures.

11. A computer program product for operating a computer, said computer program product comprising:

a computer readable medium;

first program instruction means for instructing a computer processor to allocate a variable which is living and has possibility of use after processing by an exception processing program, to a register whose contents are not changed in delivery processing, during a period of delivery processing when a flow of processing is delivered to the exception processing program written as a part of the program, in case where the exception occurs within a predetermined range of the program; and second program instruction means for instructing the computer processor to generate a code corresponding to the delivery processing.

12. A computer readable program recording medium storing a compile program for generating a code corresponding to delivery processing for delivering a flow of processing to an exception processing program written as a part of a program, thereby to enable execution of processing with respect to an exception, if the exception has occurred in a predetermined range of a program, wherein the compile program makes the computer execute procedures of:

dividing the program into base blocks in units of branch processing, and extracting a definition variable defined in each of the base blocks and a use variable to be used in each of the base blocks other than the definition variable;

investigating a variable which is living at an entry of each of the base blocks, by performing data flow analysis, based on the definition variable and the use variable in each of the base blocks;

determining a variable which is living and may be used, from the variable which is living at the entry of each of the base blocks, after the processing by the exception processing program; and allocating the variable which is living after the procedure by the exception processing program, to a register whose contents are not broken, if a procedure call obeys a procedure defined by a linkage rule.

13. A computer readable program recording medium storing a compile program for generating a code corresponding to delivery processing for delivering a flow of processing to an exception processing program written as a part of a program, thereby to enable execution of processing with respect to an exception, if the exception has occurred in a predetermined range of a program, wherein the compile program makes the computer execute procedures of:

generating an exception information table holding information concerning an exception processing program which is referred to when a flow of processing is changed by the delivery processing;

locating a relative location of the exception information table with respect to each of procedures in the program, at a location of a fixed offset from an entry of each of the procedures;

storing an entry address of a procedure called by a procedure in a calling side when a new procedure is called, into a register which can be accessed from the procedure to be called; and generating processing of jumping to return processing from a procedure and of recovering a register saved by a procedure, by enabling subtraction of an address of the return processing from the procedure, if no exception processing program corresponding to the exception is found by the delivery processing.

* * * * *